United States Patent
Kato et al.

(10) Patent No.: US 6,738,835 B1
(45) Date of Patent: May 18, 2004

(54) INFORMATION PROCESSING APPARATUS AND METHOD, AND RECORDING MEDIUM

(75) Inventors: Junji Kato, Tokyo (JP); Takehiko Nakano, Kanagawa (JP); Masao Mizutani, Kanagawa (JP); Yukihiko Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/576,507

(22) Filed: May 23, 2000

(30) Foreign Application Priority Data

May 28, 1999 (JP) .......................................... P11-150314

(51) Int. Cl.[7] .............................................. G06F 3/00
(52) U.S. Cl. ................................ 710/10; 710/2; 710/8; 710/104
(58) Field of Search ........................... 710/2, 8, 10, 15, 710/104

(56) References Cited

U.S. PATENT DOCUMENTS

| | | | |
|---|---|---|---|
| 6,199,136 B1 * | 3/2001 | Shteyn | 710/305 |
| 6,202,103 B1 * | 3/2001 | Vonbank et al. | 710/15 |
| 6,233,611 B1 * | 5/2001 | Ludtke et al. | 709/223 |
| 6,349,352 B1 * | 2/2002 | Lea | 710/72 |
| 6,366,964 B1 * | 4/2002 | Shima et al. | 710/8 |
| 6,456,892 B1 * | 9/2002 | Dara-Abrams et al. | 700/83 |
| 6,460,030 B1 * | 10/2002 | Ludtke | 707/3 |
| 6,480,889 B1 * | 11/2002 | Saito et al. | 709/220 |
| 6,523,696 B1 * | 2/2003 | Saito et al. | 709/223 |

OTHER PUBLICATIONS

Sony et al., The HAVi Specification: Specification of the Home Audio/Video Interoperability (HAVi) Architecture. HAVi Specification, Nov. 19, 1998, pp. 1–384.

* cited by examiner

Primary Examiner—Jeffrey Gaffin
Assistant Examiner—Eron Sorrell
(74) Attorney, Agent, or Firm—Bell, Boyd & Lloyd LLC

(57) ABSTRACT

An information processing apparatus in a bus system consisting of electronic devices and one or more information processing apparatus to control the electronic devices. The apparatus includes a storage means for storing management information of control software elements for controlling the electronic devices; an acquisition means for acquiring a change of the connection state of each electronic device to a bus constituting the bus system; and an execution means for executing assignment of the control software element, which is used for controlling the electronic device relevant to the acquired change of the connection state, on the basis of the connection state change acquired by the acquisition means. The acquisition means further serves to acquire device attribute information relative to the electronic devices, and the execution means makes a decision, on the basis of such device attribute information, as to whether the electronic device is the one controllable by the information processing apparatus and executes the assignment in accordance with the result of such a decision as well. In this apparatus, the routine of assigning the control software elements can be completed fast.

12 Claims, 12 Drawing Sheets

| TARGET DEVICE | NUID13 | NUID14 |
|---|---|---|
| CONTROLLER HOLDING VIRTUAL DEVICE | NUID12 | NUID11 |

| TARGET DEVICE | NUID13 | NUID14 | NUID82 | NUID83 |
|---|---|---|---|---|
| CONTROLLER HOLDING VIRTUAL DEVICE | NUID12 | NUID11 | NUID11 | NUID11 |

F I G. 9

| TARGET DEVICE | NUID13 | NUID14 | NUID82 |
|---|---|---|---|
| CONTROLLER HOLDING VIRTUAL DEVICE | NUID12 | NUID11 | NUID11 |

F I G. 12 A

| TARGET DEVICE | NUID13 | NUID14 | NUID82 |
|---|---|---|---|
| CONTROLLER HOLDING VIRTUAL DEVICE | | | |

F I G. 12 B

| TARGET DEVICE | NUID13 | NUID14 | NUID82 |
|---|---|---|---|
| CONTROLLER HOLDING VIRTUAL DEVICE | | NUID11 | NUID11 |

F I G. 12 C

| TARGET DEVICE | NUID13 | NUID14 | NUID82 |
|---|---|---|---|
| CONTROLLER HOLDING VIRTUAL DEVICE | NUID11 | NUID11 | NUID11 |

F I G. 14A
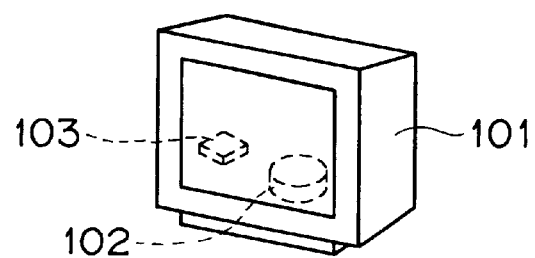
F I G. 14B
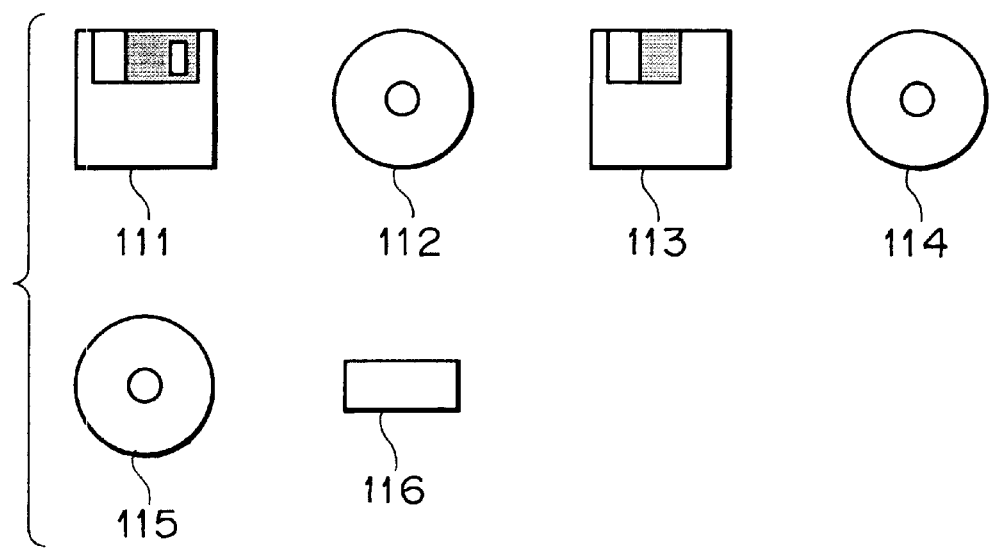

INFORMATION PROCESSING APPARATUS AND METHOD, AND RECORDING MEDIUM

BACKGROUND OF THE INVENTION

The present invention relates to an information processing apparatus, an information processing method and a recording medium, and more particularly to those adapted to achieve simplified and exact confirmation of a controller which manages each of target devices connected to a bus.

Recently, the IEEE1394 high-performance serial bus (hereinafter referred to simply as 1394 bus) is widely diffused in use. This 1394 bus permits connection of a maximum of 64 devices thereto. And data can be transferred digitally among the devices connected mutually via such a 1394 bus. In a bus system connected by means of this 1394 bus, each of the devices is discriminated from any other device and identified as either a target device to be controlled with regard to its operation or as a controller serving to control the other device (target device). The controller holds a device driver for controlling a controllable target device. And any device not holding a device driver controls the target device via a controller which holds a device driver for controlling the desired target device.

In a 1394 bus, there occurs a bus reset when the system power is switched on, or when any new device is connected additionally to the system or any existing device is disconnected from the system. Upon occurrence of such a bus reset, it is necessary to execute a routine of device driver rearrangement for assigning the device drivers to be held in controllers. In the conventional system known heretofore, there exists a problem in the point that, since the routine of device driver rearrangement needs to be executed with regard to the entire device drivers, a considerable time is required for such rearrangement.

SUMMARY OF THE INVENTION

It is therefore an object of the present invention to realize faster execution of such device driver rearrangement.

According to a first aspect of the present invention, there is provided an information processing apparatus which includes a storage means for storing management information of control software elements for controlling the electronic devices; an acquisition means for acquiring a change of the connection state of each electronic device to a bus constituting a bus system; and an execution means for executing assignment of the control software element, which is used for controlling the electronic device relevant to the acquired change of the connection state, on the basis of the connection state change acquired by the acquisition means.

The acquisition means further serves to acquire device attribute information relative to the electronic devices; and the execution means makes a decision, on the basis of the device attribute information acquired by the acquisition means, as to whether the electronic device is the one controllable by the information processing apparatus including the self apparatus, and executes the assignment of the control software element in accordance with the result of such a decision as well.

The storage means stores, as management information, the relation of mutual correspondence between the electronic devices and the information processing apparatus that hold the control software elements for controlling the electronic devices; and the execution means makes a decision as to whether the electronic device relevant to the change of the connection state is included or not in the management information stored in the storage means, and then executes the assignment in accordance with the result of such a decision as well.

The acquisition means acquires the change of the connection state of the electronic device when the bus is reset.

In this bus system, the bus is an IEEE1394 high-performance serial bus, and the acquisition means acquires the connection state change in accordance with the difference of the node unique ID existing in the IEEE1394 bus before and after the bus reset.

According to a second aspect of the present invention, there is provided an information processing method which includes a storage step of storing management information of control software elements for controlling the electronic devices; an acquisition step of acquiring a change of the connection state of each electronic device to a bus constituting the bus system; and an execution step of executing assignment of the control software element, which is used for controlling the electronic device relevant to the acquired change of the connection state, on the basis of the connection state change acquired at the acquisition step.

And according to a third aspect of the present invention, there is provided a recording medium containing a program which enables a computer to execute the following routine so as to control an information processing apparatus. The routine includes a storage step of storing management information of control software elements for controlling the electronic devices; an acquisition step of acquiring a change of the connection state of each electronic device to a bus constituting the bus system; and an execution step of executing assignment of the control software element, which is used for controlling the electronic device relevant to the acquired change of the connection state, on the basis of the connection state change acquired at the acquisition step.

In the information processing apparatus and method of the present invention and the program contained in the recording medium thereof, first the management information of the control software elements for controlling the electronic devices is stored, and there is acquired a change of the connection state of each electronic device to the bus constituting a bus system. And in accordance with the connection state change thus acquired, the assignment of the control software element is executed for controlling the electronic device relevant to such connection state change.

The above and other features and advantages of the present invention will become apparent from the following description which will be given with reference to the illustrative accompanying drawings.

BRIEF DESCRIPTION OF THE DRAWINGS

FIG. 9 shows a further example of the table;

FIGS. 12A–12C show other examples of the NUID information table;

FIGS. 14A and 14B are diagrams for explaining recording media.

DESCRIPTION OF THE PREFERRED EMBODIMENTS

Figure 1:
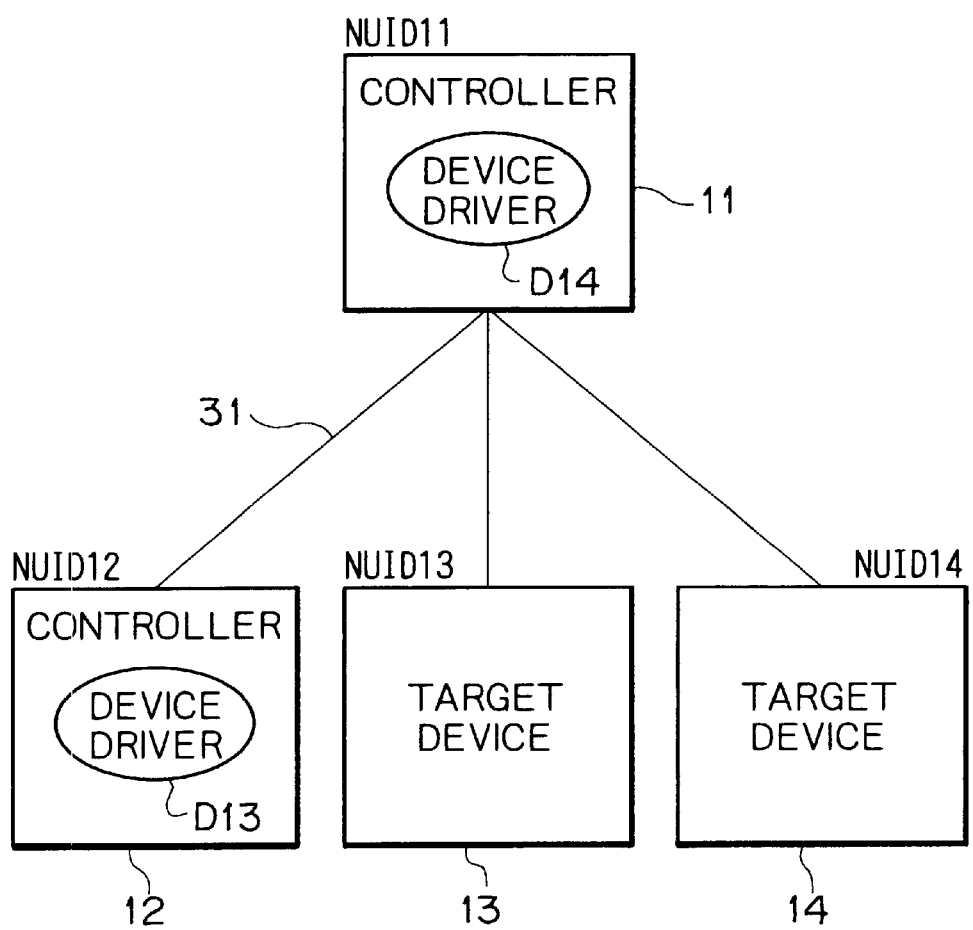
FIG. 1 is a block diagram showing a structural example of a bus system where the present invention is applied.

FIG. 1 shows a structural example of a bus system where the present invention is applied. In this bus system, a controller 12, a target device 13 and a target device 14 are connected to a controller 11 via an IEEE1394 high-performance serial bus 31. The controller 11 has NUID11 as a node unique ID, and the controller 12 has NUID12 as a node unique ID. Similarly the target device 13 and the target device 14 have NUID13 and NUID14, respectively, as a node unique ID thereof.

Figure 2:
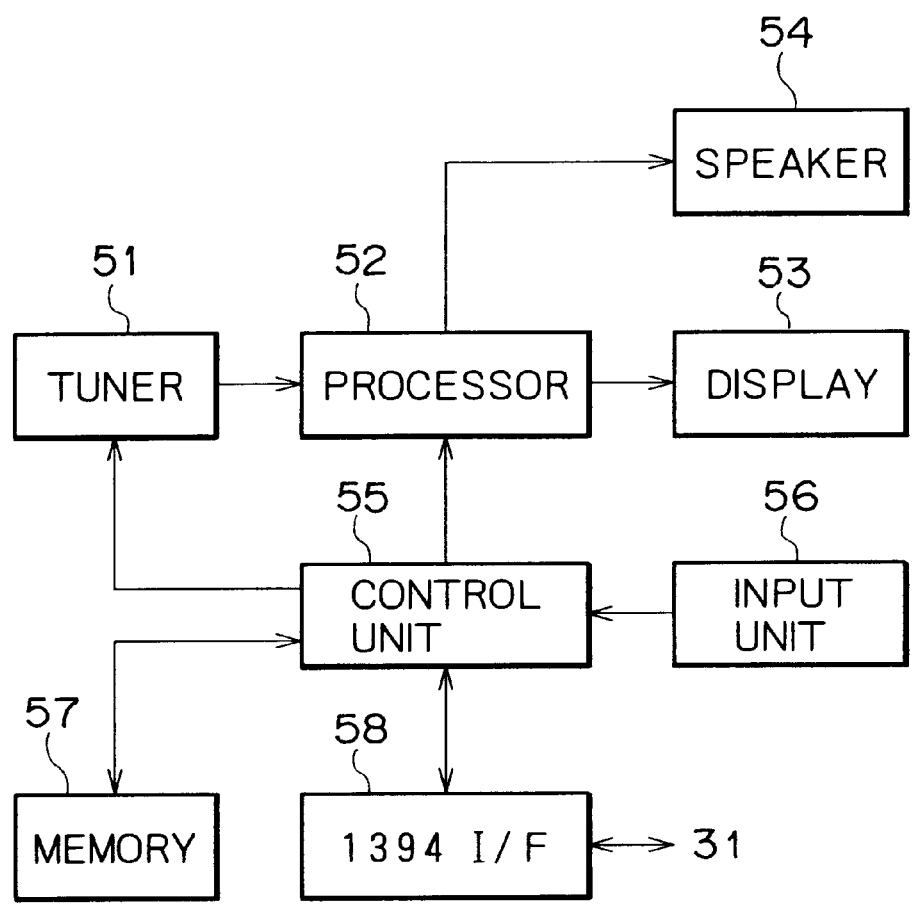
FIG. 2 is a block diagram showing a structural example of a television receiver 41 as a controller 11 in FIG. 1.

The controller 11 consists of a television receiver 41 shown in FIG. 2 for example. A tuner 51 demodulates a signal of a predetermined channel received via an unshown antenna and then outputs its intermediate frequency signal to a processor 52. The processor 52 demodulates the intermediate frequency signal obtained from the tuner 51 and outputs a video signal to a display 53 for displaying the signal thereon, while outputting an audio signal to a speaker 54 for emitting sound therefrom.

A control unit 55 consists of a microcomputer or the like for example and controls each section in response to a command from an input unit 56 consisting of a button, switch or remote controller. A memory 57 consists of an EEPROM or the like for example and stores predetermined information therein even in a power-off state. A 1394 interface (IF) 58 executes an interfacing process with the 1394 bus 31.

Figure 3:
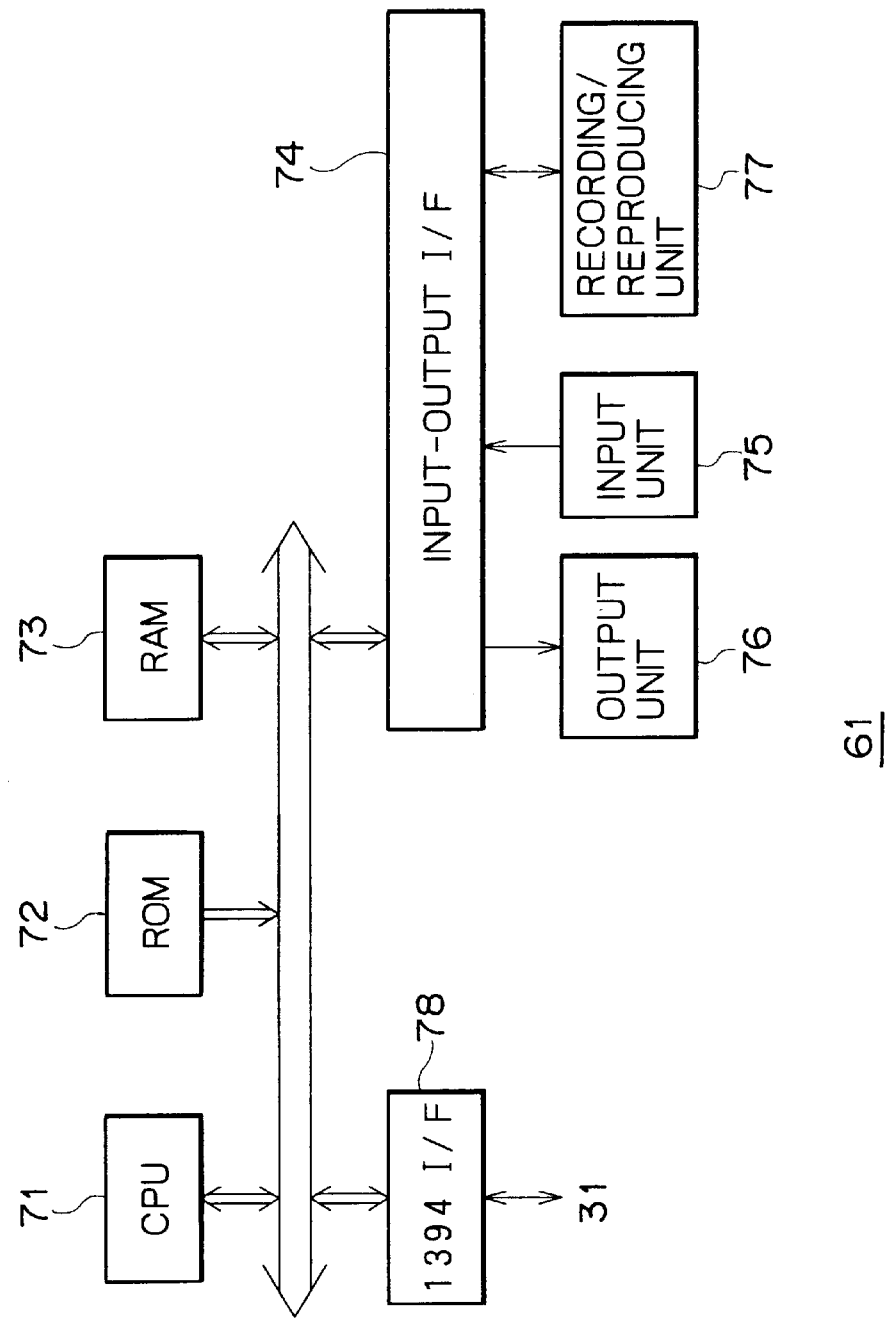
FIG. 3 is a block diagram showing a structural example of a video cassette recorder 61 as a target device 13 in FIG. 1.

The target device 13 consists of a video cassette recorder 61 shown in FIG. 3 for example. A CPU 71 executes various processes in accordance with a program stored in a ROM 72. Meanwhile in a RAM 73, there are stored programs and data required for the CPU 71 to execute various processes. An input-output interface 74 receives an input from an input unit 75 consisting of a button switch, a remote commander and so forth, and outputs video data and audio data to an output unit 76 consisting of output terminals and so forth. A recording/reproducing unit 77 is also connected to the input-output interface 74 to perform an operation of recording data in or reproducing the same from a video cassette (not shown) loaded in the recording/reproducing unit 77.

A 1394 interface 78 executes an interfacing process with the 1394 bus 31.

The controller 12 consists of a personal computer for example, and the target device 14 consists of a CD player or the like for example. A detailed explanation on the structure thereof is omitted here.

It is supposed that, in the memory 57 of the television receiver 41 functioning as the controller 11, there is already stored a table which holds the relationship of mutual correspondence between the target devices in the 1394 bus system and the controllers having software elements such as device drivers (virtual devices) to control the target devices.

In this embodiment, as shown in FIG. 1, the controller 11 has a device driver D14 to control the target device 14, and the controller 12 has a device driver D13 to control the target device 13. Therefore, as shown in FIG. 4, NUID12 serving as a node unique ID of the controller 12 is stored correspondingly to NUID13 serving as a node unique ID of the target device 13, and NUID11 serving as a node unique ID of the controller 11 is stored correspondingly to NUID14 serving as a node unique ID of the target device 14.

Figures 4, 5:
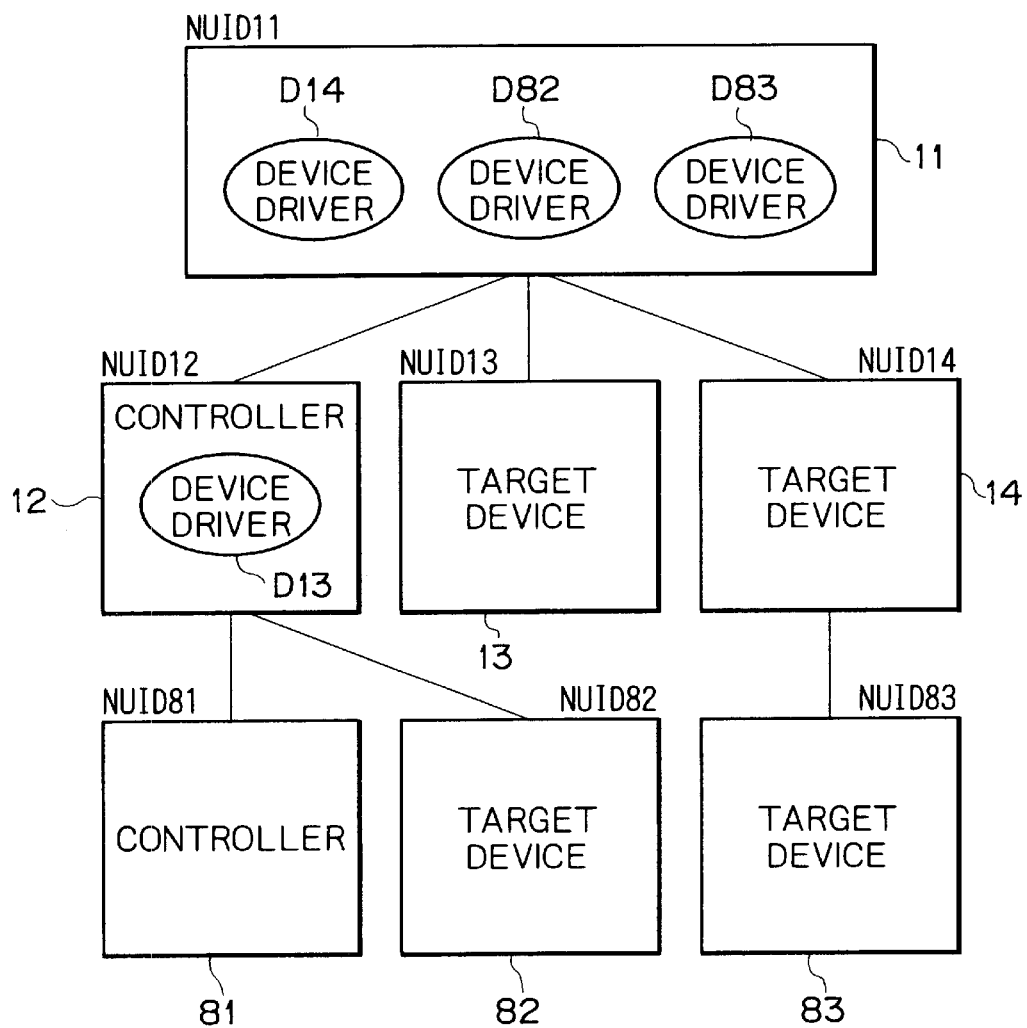
FIG. 4 shows an example of a NUID information table held by the controller 11 in FIG. 1.
FIG. 5 is a block diagram showing another structural example of the bus system.

Suppose now that, in the state mentioned above, the connection in the bus system is so changed as shown in FIG. 5 for example. In this case, a controller 81 and a target device 82 are connected to a controller 12 via a 1394 bus 31, and a target device 83 is connected to a target device 14. The controller 81, the target device 82 and the target device 83 have, respectively, NUID81, NUID82 and NUID83 each serving as a node unique ID thereof.

When any new device is connected to the 1394 bus 31, there occurs a bus reset, and then a bus master (e.g., controller 11) in the 1394 bus executes a process of node ID assignment to each device and also a process of device driver assignment. Next, such device driver assignment (first embodiment) will be described below with reference to a flowchart of FIG. 6.

At step S1, the control unit 55 of the controller 11 (television receiver 41) selects one of the nodes connected to the 1394 bus 31, whereby the video cassette recorder 61 (target device 13) for example is selected. At step S2, the control unit 55 inquires of the node (video cassette recorder 61) selected at step S1 about the node unique ID (NUID) thereof and whether the video cassette recorder 61 is a target or not (controller or not). That is, the control unit 55 in this case controls the 1394 interface 58 and outputs a command packet to the selected node (video cassette recorder 61) via the 1394 bus 31 so as to execute the inquiry.

Each node contains a configuration ROM which stores therein a flag indicative of whether the relevant node has a function as a controller capable of controlling the other node or a function as a target device controlled by the other node. The target device 13 (video cassette recorder 61) holds such configuration ROM in the ROM 72. Upon reception of this inquiry command via the 1394 interface 78, the CPU 71 reads out the self flag from the configuration ROM and then outputs it as a response from the 1394 interface 78.

Upon reception of the response packet via the 1394 interface 58, the control unit 55 of the television receiver 41 extracts the flag and makes a decision at step S3 as to whether the flag indicates the target device or not. If the flag indicates the target device of the node, the operation proceeds to step S4, where the control unit 55 makes a decision as to whether the controller having a device driver to control the target device is already stored or not in the NUID information table stored in the memory 57. Even in the bus reset state, each controller still holds the preceding device driver held prior to occurrence of the bus reset. Since it is therefore not necessary to alter the table portion corresponding to the target device, the operation proceeds to step S6, where the control unit 55 makes another decision as to whether all the nodes have been selected or not, and if the result of this decision signifies that there is any node not selected yet, the operation returns to step S1.

In this case, as shown in FIG. 4, there is already stored on the table that the controller holding the device driver for the target device 13 is the controller 12, so that the operation returns to step S1.

Subsequently at step S1, the control unit 55 selects the target device 14 for example and then executes the same process as in the foregoing case. Since the device driver for the target device 14 is already stored on the table as shown in FIG. 4, the same process is executed as in the foregoing case described above.

Next, in case the controller 12 for example is selected as one node, the result of the decision at step S3 is NO since this node is not a target device (but a controller), so that the operation returns to step S1 from step S6. The same process is executed also when the controller 81 is selected as a node.

In case the target device 82 is selected as one node, the controller holding a device driver for this target device has not yet been stored on the table. Therefore, the result of the decision at step S4 is NO, and the operation proceeds to step S5, where the control unit 55 designates, in accordance with a predetermined rule, the controller to hold the device driver which controls the selected target device (in this case, target device 82).

This designation enables selection of the controller with the least node unique ID out of the entire controllers having a function to hold a device driver. In the example of FIG. 5, NUID11, i.e., the node unique ID of the controller 11, is the least in the entire node unique ID of the nodes, and this node 11 (television receiver 41) has the memory 57 to store the table, so that the controller 11 is designated as a controller to hold the device driver D82 for controlling the target device 82. That is, at this time, the control unit 55 designates itself. The control unit 55 creates the device driver D82 and stores the same in the memory 57.

Figures 7, 8:
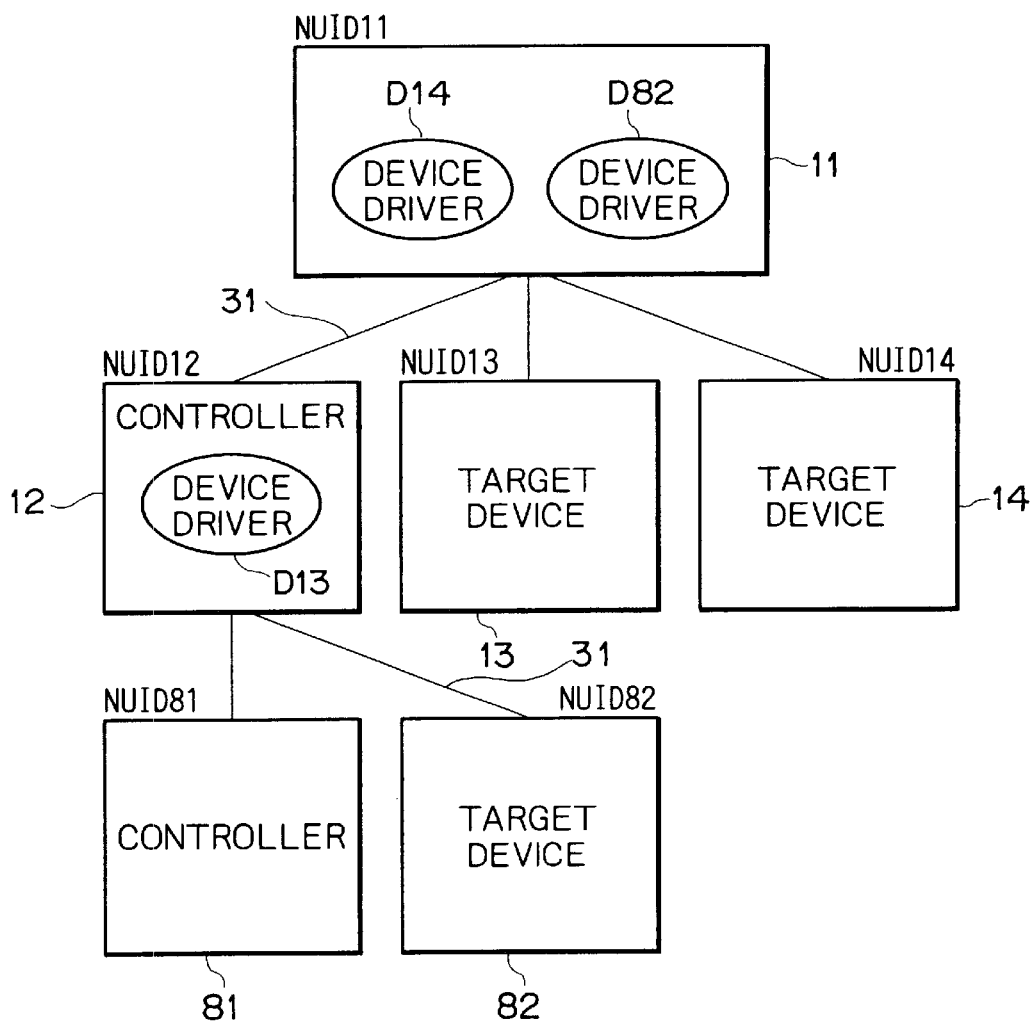
FIG. 7 shows another example of the NUID information table.
FIG. 8 is a block diagram showing a further structural example of the bus system where the present invention is applied.

Further, as shown in FIG. 7, the control unit 55 stores the node unique ID11 of the controller that holds the device driver D82 for controlling the target device 82, correspondingly to the NUID82 which is the node unique ID of the target device 82.

As the operation returns from step S6 to step S1, the target device 83 is selected as one node, and similarly to the above, the controller 11 creates and holds, in the memory 57, the device driver D83 for controlling the target device 83 and, as shown in FIG. 7, stores the NUID11 which is the node unique ID of the controller that holds the device driver D83 for controlling the target device 83, correspondingly to the NUID83 which is the node unique ID of the target device 83.

When the result of the decision at step S6 signifies that the entire nodes have been selected after completion of the above procedure, the control unit 55 makes a decision at step S7 as to whether there exists any target device stored already on the table and not selected at step S1 this time. In case merely a new node has been added to the bus system, the result of this decision becomes NO, and the processing routine is terminated.

Meanwhile, in case the target device 83 connected in the state of FIG. 5 has been disconnected from the bus system as shown in FIG. 8 for example, the result of the decision at step S7 becomes YES. Then the control unit 55 executes, at step S8, a process of deleting from the table the target device stored on the table and not selected this time. More specifically, the relevant target device is the one stored once on the table but disconnected from the bus system, and therefore it has not been selected as a node this time, so that it is deleted from the table. As a result, the table is rewritten from the state of FIG. 7 to the one shown in FIG. 9. In this example, there are deleted NUID83 as the node unique ID of the target device 83 and NUID11 as the node unique ID of the controller holding the device driver D83.

At this time, the device driver D83 of the controller 11 is also deleted, as shown in FIG. 8.

Figure 10:
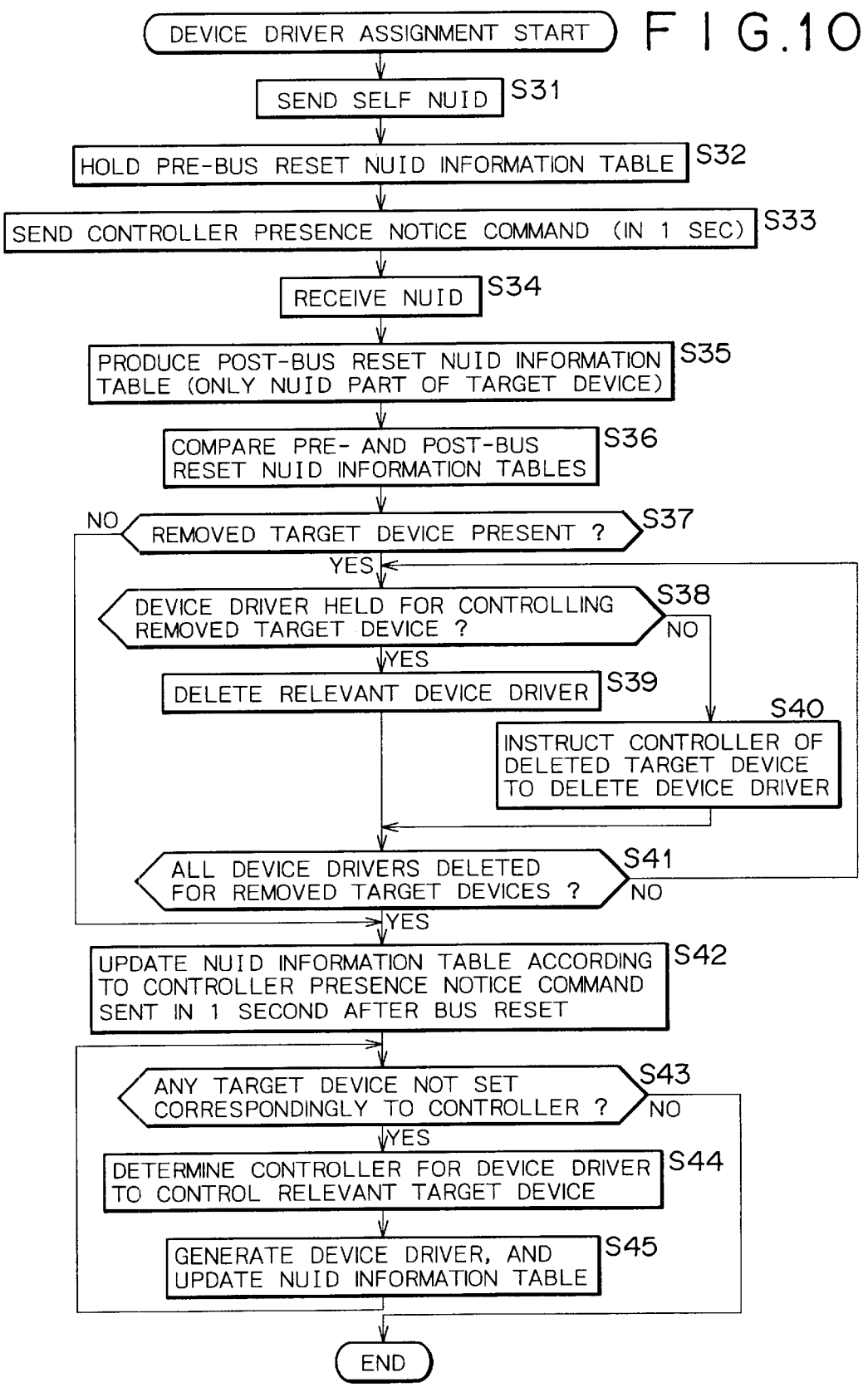
FIG. 10 is a flowchart for explaining another processing routine of device driver assignment.
Figure 11:
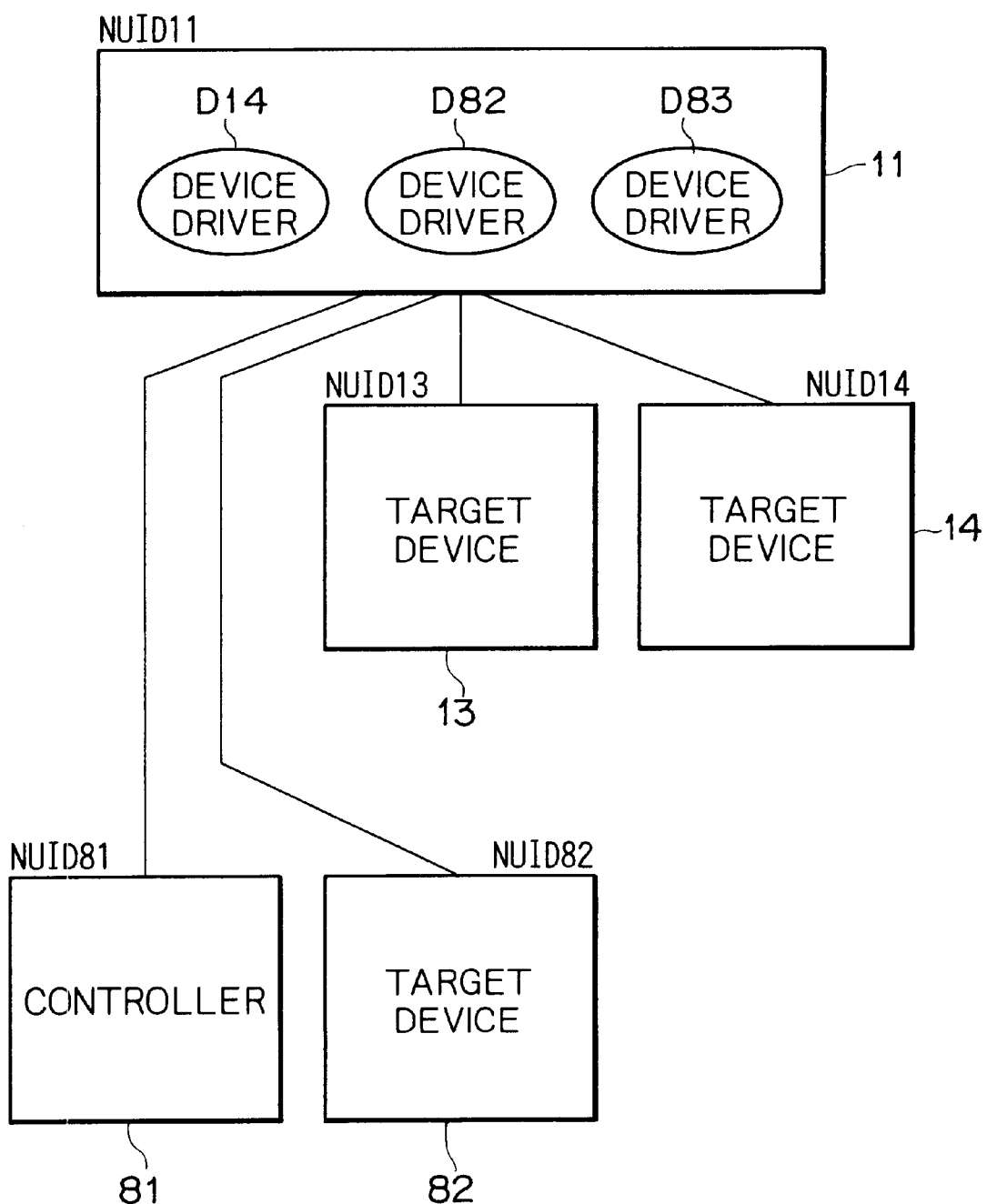
FIG. 11 is a block diagram showing another structural example of the bus system.

Next, an explanation will be given on another processing routine of device driver assignment (second embodiment) with reference to a flowchart of FIG. 10. This example represents an exemplary case where the connection in the bus system of FIG. 5 has been changed as shown in FIG. 11.

When any connected devices have thus been disconnected from the 1394 bus 31 (e.g., when the controller 12 and the target device 83 have been disconnected), the bus is reset similarly to the foregoing case described above, and the bus master (e.g., controller 11) in the bus system executes a routine of device driver assignment.

In case the bus system has a construction based on a HAVi (Home Audio/Video initiative) architecture, the controller 11 corresponds to a DCM manager which has leadership for installation and is capable of assigning DCM (Device Control Module) or FCM.

At step S31, the control unit 55 of the controller 11 (television receiver 41) reads out the self node unique ID (NUID11) from the configuration ROM stored in the memory 57 and then sends the node unique ID to the entire devices connected to the bus system. Such transmission of the node unique ID after the bus reset in this routine is executed with regard to the entire devices (in the example of FIG. 11, controllers 11, 81 and target devices 13, 14, 82) connected to the bus system.

At step S32, the control unit 55 executes a process of holding the pre-bus reset NUID information table. Consequently, if a post-bus reset NUID information table is produced at, e.g., step S35 which will be mentioned later, the pre-bus reset NUID information table is still held.

In this example, the control unit 55 executes a process of holding the NUID information table where, as shown in FIG. 7, the node unique ID (NUID13) of the target device 13 and the node unique ID (NUID12) of the controller 12 are set correspondingly to each other, and the node unique ID (NUID14, NUID82) of the target devices 14, 82 and the node unique ID (NUID11) of the controller 11 are set correspondingly to each other.

At step S33, the control unit 55 sends a command packet (hereinafter referred to as a controller presence notice command), which notifies that the unit 55 is a controller, to the entire devices connected to the bus system within a lapse of one second after occurrence of the bus reset. Similarly, each of the controllers (in the example of FIG. 11, controllers 11 and 81) connected to the bus system also sends such a controller presence notice command.

Subsequently at step S34, the control unit 55 receives the node unique ID sent thereto at step S31 from the entire devices connected to the bus system. Thereafter at step S35, a post-bus reset NUID information table shown in FIG. 12A is produced in accordance with the node unique ID thus received. More specifically, there is produced a NUID information table where the node unique ID of merely the target device alone is set out of the entire received node unique ID. The node unique ID of the controller is used in producing an undermentioned NUID table for the controller.

In this example, the target device 83 connected previously in the state of FIG. 5 is not present in the state of FIG. 11 (i.e., removed from the bus system), so that the controller 11 does not receive the node unique ID (NUID83) from the target device 83. Therefore, NUID83 is not set on the NUID information table produced here.

Next at step S36, the control unit 55 mutually compares the node unique ID of the target devices set respectively on the pre-bus reset NUID information table held at step S32 and on the post-bus reset NUID information table produced at step S35.

Subsequently at step S37, the control unit 55 makes a decision as to whether there exists any node unique ID (deleted node unique ID) which is set on the pre-bus reset NUID information table but is not set on the post-bus reset NUID information table. And if the result of this decision signifies that such node unique ID is present, the operation proceeds to step S38. That is, a decision is made here as to whether any target device removed from the bus system is present or not, and in case the result of this decision signifies that such a target device is present, the operation proceeds to step S38.

Since the target device 83 is removed from the bus system in this example, NUID83 set previously on the pre-bus reset NUID information table (FIG. 7) is not present on the post-bus reset NUID information table (FIG. 12A), so that the operation proceeds to step S38.

Thereafter at step S38, the control unit 55 selects one node unique ID out of the entire deleted node unique ID, and then makes a decision as to whether the self holds the device driver to control the target device having the selected node unique ID (i.e., one of the target devices removed from the bus system). And if the result of this decision is affirmative, the operation proceeds to step S39 to delete the relevant device driver.

In this example, NUID83 is selected, and there is deleted the device driver D83 which is held by the controller 11 and serves to control the target device 83 having NUID83.

Meanwhile, if the result of the decision made by the control unit 55 at step S38 signifies that the self does not hold the device driver to control the target device, the operation proceeds to step S40, where a command packet for executing deletion is sent to the controller which holds the relevant device driver. And in response to the command packet thus received, the controller deletes the device driver that have been held.

After the self deletes the device driver at step S39 or a command packet for deletion of the device driver is sent at step S40, the operation of the control unit 55 proceeds to step S41.

Then at step S41, the control unit 55 makes a decision as to whether all the device drivers for controlling the removed target devices have been entirely deleted or not by the process at step S39 or S40. And if the result of this decision signifies that any non-deleted target device is still present, the operation returns to step S38, and the subsequent processes are executed. More specifically, the processes from step S38 through step S40 are executed repeatedly until the entire device drivers for controlling the removed target devices are deleted completely from the bus system.

If the result of the decision at step S37 signifies that none of the removed target devices is present, or if the result of the decision at step S41 signifies that the entire device drivers for controlling the removed target devices have been completely deleted, the operation proceeds to step S42.

Subsequently at step S42, the control unit 55 produces a controller NUID table to manage the node unique ID of the controller connected to the bus system, in response to the result of reception of the controller presence notice command sent at step S33 from the other controller connected to the bus system (i.e., the command packet sent within a lapse of one second after occurrence of a bus reset state), and by the use of such a controller NUID table, the control unit 55 updates the post-bus reset NUID information table (FIG. 12A) produced at step S35. Although not shown in the diagram, the node unique ID of the controllers connected to the bus system are set on the controller NUID table. In this example, the node unique ID (NUID11 and NUID81) of the controllers 11 and 81 are set.

Explaining the above process more specifically, a decision is made as to whether the node unique ID of the controller having sent the controller presence notice command therefrom (i.e., the node unique set on the controller NUID table) is existent or not on the pre-bus reset NUID information table. And if the result of this decision is affirmative, there is detected the node unique ID of the target device set correspondingly to the node unique ID of the relevant controller.

Thereafter a decision is made as to whether the node unique ID of the detected target device is set or not on the post-bus reset NUID information table. And if the result of this decision is affirmative, the node unique ID of the source controller is set correspondingly to the node unique ID of the relevant target device.

In case the result of the above decision signifies that the node unique ID of the source controller having sent the controller presence notice command therefrom is not set on the pre-bus reset NUID information table, then the node unique ID of the source controller is not set on the post-bus reset NUID information table.

Meanwhile, in case the result of the above decision signifies that the node unique ID of the source controller is set on the pre-bus reset NUID information table but the node unique ID of the target device set correspondingly to the node unique ID of the source controller is not set on the post-bus reset NUID information table, then the node unique ID of the relevant controller is not set on the post-bus reset NUID information table.

The node unique ID (NUID11) of the self (controller 11) is similarly verified, and in accordance with the result of such verification, the node unique ID of the self is set on the post-bus reset NUID information table.

In this example, the post-bus reset NUID information table is updated as shown in FIG. 12B. The controller 11 receives the controller presence notice command (within a lapse of one second after occurrence of the bus reset state) from the controller 81, but the node unique ID (NUID81) of the controller 81 is not existent on the pre-bus reset NUID information table (FIG. 7). Therefore, NUID81 is not set on the post-bus reset NUID information table (FIG. 12A).

On the pre-bus reset NUID information table (FIG. 7), the node unique ID (NUID11) of the controller 11 itself is set correspondingly to the node unique ID (NUID14, NUID82, NUID83) of the target devices. And the node unique ID (NUID14, NUID82) are set on the post-bus reset NUID information table (FIG. 12A), so that NUID11 is set correspondingly thereto as shown in FIG. 12B.

Subsequently at step S43, the control unit 55 makes a decision with reference to the post-bus reset NUID information table (FIG. 12B) updated at step S42, as to whether there is present or not the node unique ID of the target device to which the node unique ID of the controller is not set correspondingly. And if the result of this decision signifies that such node unique ID is present, the operation proceeds to step S44, where one node unique ID is selected and then the controller is determined for holding the device driver to control the target device having the selected node unique ID.

Figure 6:
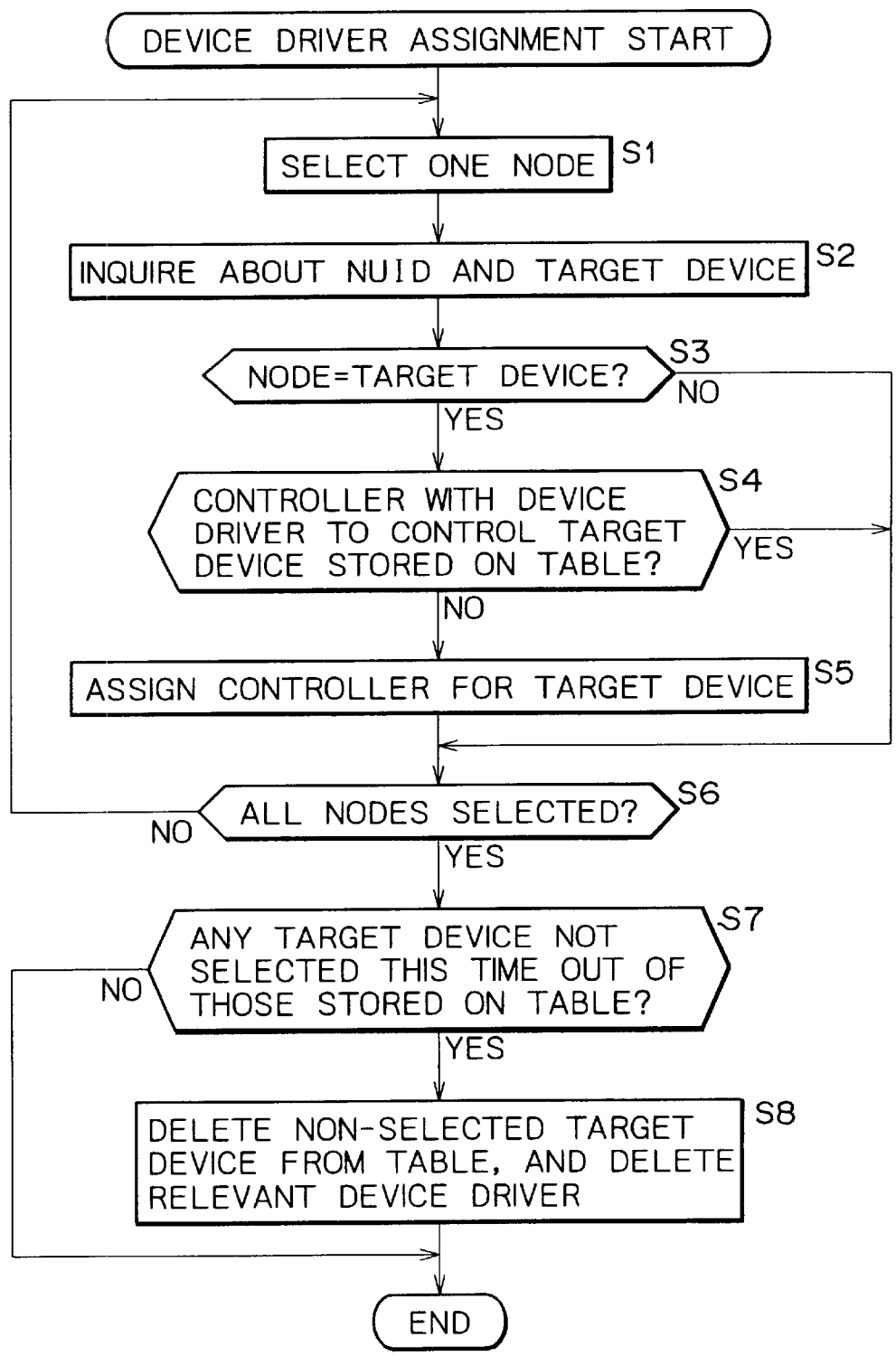
FIG. 6 is a flowchart for explaining a processing routine of device driver assignment.

This determination can be performed in the same manner as at step S5 in FIG. 6 for example. In case the controller 11 is a DCM manager, the controller for holding the device driver can be determined in accordance with a DCM manager preference where the priority order of the controller capable of holding the target device is preset.

In this example, the node unique ID of the controller is not set correspondingly to NUID13 (node unique ID of the target device 13) on the post-bus reset NUID information table (FIG. 12B) updated at step S41, so that the controller for holding the device driver D13 to control the target device 13 is determined. In this case, the controller 11 serves to hold the device driver D13.

Next at step S45, the control unit 55 outputs a command packet, which generates a device driver to control the target device detected at step S43, to the controller determined at step S44. Thereafter the control unit 55 sets, on the post-bus reset NUID information table, the node unique ID of the source controller that has sent the command packet therefrom, correspondingly to the node unique ID of the target device to which the node unique ID of the controller is not set correspondingly.

In response to the command packet for generating a device driver, the controller generates a device driver to control the designated target device and then stores the same.

Figure 13:
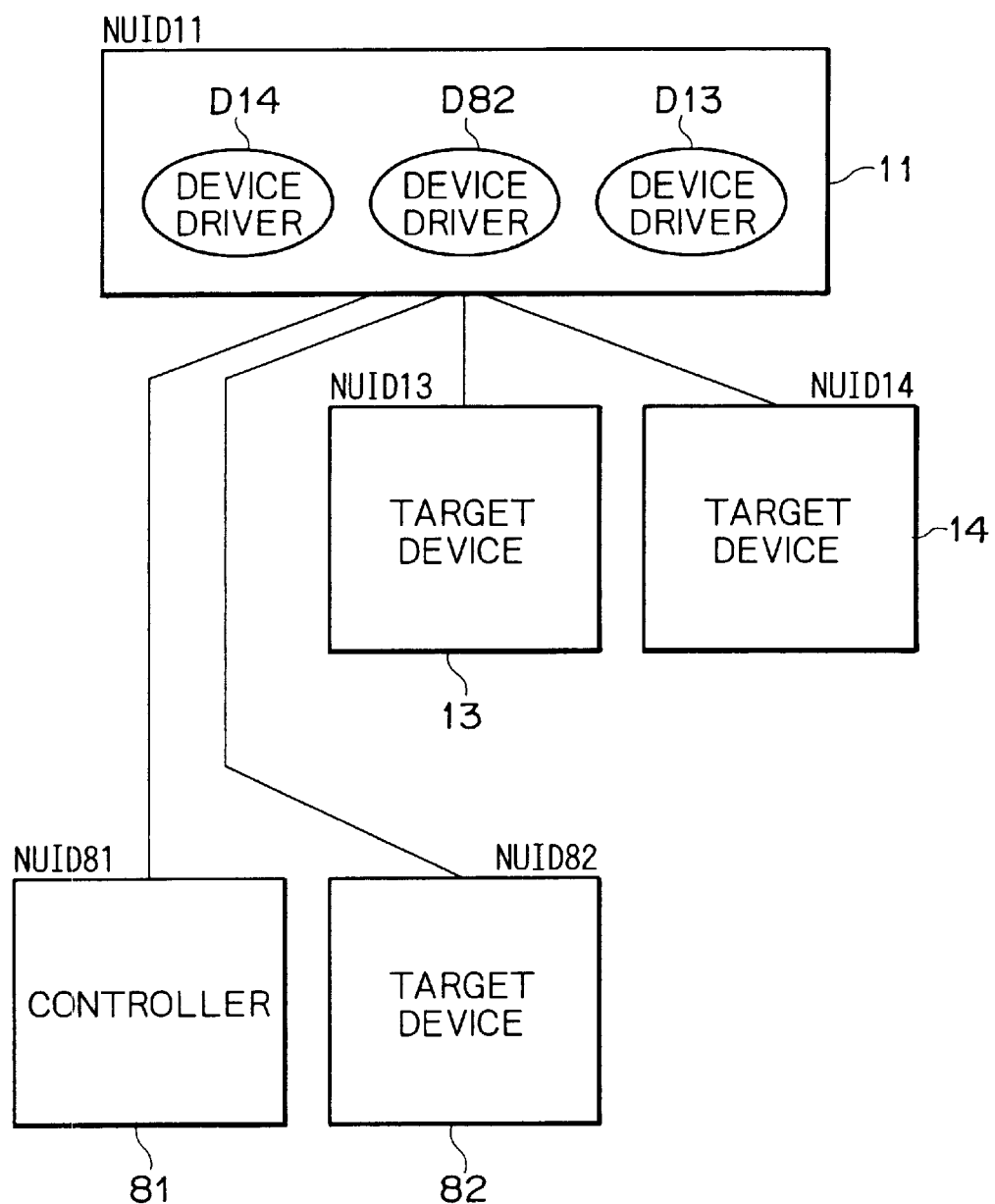
FIG. 13 is a block diagram showing a state where the controller 11 in the bus system of FIG. 11 newly holds the device driver D13.

In this example, the controller 11 itself generates the device driver D13 (for example, uploads from the targed device 13) to control the target device 13 and stores the same as shown in FIG. 13. Then the control unit 55 sets, on the post-bus reset NUID information table, the node unique ID (NUID11) of the controller 11 correspondingly to the node unique ID (NUID13) of the target device 13, as shown in FIG. 12C.

After the process at step S45, the operation returns to step S43 and then the subsequent processes are executed. That is, the processes from step S43 through step S45 are executed repeatedly until the result of the decision at step S43 signifies that none of the node unique ID of the target device, to which the node unique ID of the controller is not set correspondingly, is existent on the NUID information table.

Upon complete termination of the device driver assignment, the pre-bus reset NUID information table retained by the process at step S32 is erased, and only the post-bus reset NUID information data at the termination of the device driver assignment is retained. That is, when the bus is reset again, this NUID information table is retained as a pre-bus reset NUID information table.

The above description represents an exemplary case where one device has been disconnected from the system bus (i.e., when the bus state has been changed from FIG. 5 to FIG. 11). Similarly, in case a target device is newly added, the required device driver can be assigned in the same manner as the above.

According to the routine of assignment mentioned above, when a bus reset state has thus occurred, the device drivers prior to occurrence of such a bus reset are held continuously in the respective controllers, and when any target device has been disconnected from the bus system, the relevant device driver is deleted. Meanwhile, when any target device has newly been added to the bus system, a device driver relative to the added target device only is newly created and stored. Thus, as compared with the known process of assigning the device drivers for the entire target devices at each bus reset in accordance with a predetermined rule, it becomes possible to achieve faster assignment completely.

In the embodiment described above, the bus system has a configuration of star connection. However, even if the bus system has a serial daisy chain configuration, it is still possible to execute the device driver assignment according to the same processing routine.

Referring now to FIGS. 14A and 14B, an explanation will be given on a medium used for installing a program, which is prepared to execute the above processing routine, in a television receiver (or some other apparatus) and enabling the program to be executable by the television receiver.

As shown in FIG. 14A, the program is providable for the user in a state installed previously in a hard disk 102 or a semiconductor memory 103 incorporated as a recording medium in the television receiver 101.

In another case, as shown in FIG. 14B, the program is providable as package software stored temporarily or permanently in a recording medium such as a floppy disk 111, CD-ROM (Compact Disk-Read Only Disk) 112, MO (Magneto-Optical) disk 113, DVD (Digital Versatile Disk) 114, magnetic disk 115 or semiconductor memory 116.

The term "medium" used in this specification connotes any of such entire media included in a broad-sense concept.

Also in this specification, the steps that describe the program provided by the medium connote all the time-series processes executed sequentially in the prescribed order and even those executed parallelly or individually instead of such time-series processing.

Further in this specification, the term "system" represents the whole structure consisting of a plurality of apparatus.

According to the information processing apparatus and method of the present invention and the program contained in the recording medium thereof, first the device attribute information of the electronic device is acquired, then the management information of the control software for controlling the electronic device is stored, and subsequently a change of the connection state of each electronic device to the bus is acquired. And in accordance with the connection state change thus acquired, the control software element for controlling the electronic device relevant to such connection state change is assigned to one of the information processing apparatus including the self apparatus, whereby the routine for assignment of the control software elements can be completed fast.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. An information processing apparatus in a bus system consisting of electronic devices and one or more information processing apparatus to control said electronic devices, comprising:

an acquisition means for acquiring a change of a connection state of each electronic device to a bus constituting said bus system;

a storage means for storing two types of management information of control software elements for controlling said electronic devices, management information before the change of connection and management information after the change of connection; and an execution means for executing assignment of the control software element, which is used for controlling the electronic device relevant to the acquired change of the connection state, on the basis of the connection state change acquired by said acquisition means wherein said storage means stores, as management information, the relation of mutual correspondence between said electronic devices and the information processing apparatus that hold the control software elements for controlling said electronic devices, and wherein said execution means make a decision as to whether the electronic device relevant to the change of the connection state is included or not in the management information stored in said storage means, and then executes the assignment in accordance with the result of such a decision as well, wherein management information before the change of connection is deleted and replaced with management information after the change of connection.

2. An information processing apparatus according to claim 1, wherein said acquisition means further serves to acquire device attribute information relative to said electronic devices; and said execution means makes a decision, on the basis of the device attribute information acquired by said acquisition means, as to whether said electronic device is the one controllable by said information processing apparatus including the self apparatus, and executes the assignment of the control software element in accordance with the result of such a decision as well.

3. An information processing apparatus according to claim 1, wherein said acquisition means acquires the change of the connection state of said electronic device when said bus is reset.

4. An information processing apparatus according to claim 3, wherein said bus is an IEEE1394 high-performance serial bus, and said acquisition means acquires the connection state change in accordance with the difference of the node unique ID existing in the IEEE1394 bus before and after the bus reset.

5. An information processing apparatus according to claim 3, wherein said bus is an IEEE1394 high-performance serial bus, and said acquisition means acquires the connection state change in accordance with the difference of HAVi global unique ID existing before and after the bus reset.

6. An information processing apparatus according to claim 1, wherein said bus is an IEEE1394 high-performance serial bus, and said apparatus is a final leader of the HAVi DCM manager.

7. An information processing apparatus according to claim 1, wherein said bus is an IEEE1394 high-performance serial bus, and said execution means executes the assignment of the control software element in accordance with the HAVi DCM manager preference as well.

8. An information processing apparatus according to claim 1, wherein said bus is an IEEE1394 high-performance serial bus, and said execution means executes the assignment of the control software element in such a manner that one information processing apparatus, which has the least node unique ID out of a plurality of node unique IDs of the whole information processing apparatus, holds said control software element.

9. An information processing method for an information processing apparatus in a bus system consisting of electronic devices and one or more information processing apparatus to control said electronic devices, comprising:

an acquisition step of acquiring a change of the connection state of each electronic device to a bus constituting said bus system;

a storage step of storing two types of management information of control software elements for controlling said electronic devices, management information before the change of connection and management information after the change of connection, wherein the management information includes the relation of mutual correspondence between said electronic devices and the information processing apparatus that holds the control software elements for controlling said electronic devices; and an execution step of executing assignment of the control software element, which is used for controlling the electronic device relevant to the acquired change of the connection state, on the basis of the connection state change acquired at said acquisition step wherein the execution step includes making a decision as to whether the electronic device relevant to the change of the connection state is included or not in the management information stored in said storage means, and then executing the assignment in accordance with the result of such a decision as well, wherein management information before the change of connection is deleted and replaced with management information after the change of connection.

10. A recording medium containing a program which enables a computer to execute the following routine so as to control an information processing apparatus in a bus system consisting of electronic devices and one or more information processing apparatus to control said electronic devices, said routine comprising:

an acquisition step of acquiring a change of a connection state of each electronic device to a bus constituting said bus system;

a storage step of storing two types of management information of control software elements for controlling said electronic devices, management information before the change of connection and management information after the change of connection, wherein the management information includes the relation of mutual correspondence between said electronic devices and the information processing apparatus that holds the control software elements for controlling said electronic devices; and an execution step of executing assignment of the control software element, which is used for controlling the electronic device relevant to the acquired change of the connection state, on the basis of the connection state change acquired at said acquisition step wherein the execution step includes making a decision as to whether the electronic device relevant to the change of the connection state is included or not in the management information stored in said storage means, and then executing the assignment in accordance with the result of such a decision as well wherein management information before the change of connection is deleted and replaced with management information after the change of connection.

11. An information processing method in a bus system in which one or more controlled apparatus, one or more controlling apparatus and a management apparatus are connected via a bus, comprising:

an acquisition step of acquiring a change of a connection state to the bus by the controlling apparatus;

a storage step of storing two types of management information of control software elements for controlling the control apparatus, management information before the change of connection and management information after the change of connection, wherein the management information includes the relation of mutual correspondence between the controlled apparatus and the information regarding control of the said controlled apparatus by the management apparatus;

an update step of updating the relation of mutual correspondence as to the controlled apparatus relevant to the change of the connection state and the information regarding control of the controlled apparatus on the basis of the change of the connection state; and an execution step of executing assignment of the information used for controlling the controlled apparatus on the basis of the relation of mutual correspondence, wherein management information before the change of connection is deleted and replaced with management information after the change of connection.

12. An information processing system in which one or more controlled apparatus, one or more controlling apparatus and a management apparatus are connected via a bus, comprising:

an acquisition means for acquiring a change of the connection state to the bus;

a storage means for storing two types of management information of control software elements for controlling the control apparatus, management information before the change of connection and management information after the change of connection, wherein the management information includes the relation of mutual correspondence between the controlled apparatus and the information regarding control of the said controlled apparatus;

an update means for updating the relation of mutual correspondence as to the controlled apparatus relevant to the change of the connection state and the information regarding control of the controlled apparatus on the basis of the change of the connection state; and an execution means for executing assignment of the information used for controlling the controlled apparatus on the basis of the relation of mutual correspondence, wherein management information before the change of connection is deleted and replaced with management information after the change of connection.

* * * * *